United States Patent
Sutherland et al.

(10) Patent No.: US 8,864,086 B2
(45) Date of Patent: Oct. 21, 2014

(54) APPARATUS FOR GUIDING CABLE

(71) Applicant: Caterpillar Inc., Peoria, IL (US)

(72) Inventors: Thomas Marvin Sutherland, Montgomery, IL (US); Brad Beck, Peru, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/652,567

(22) Filed: Oct. 16, 2012

(65) Prior Publication Data

US 2014/0103171 A1   Apr. 17, 2014

(51) Int. Cl.
*F16L 3/08* (2006.01)

(52) U.S. Cl.
USPC ............... 248/74.3; 49/58; 49/74.1; 49/300

(58) Field of Classification Search
CPC .................................... F16L 3/00; F16L 34/14
USPC ............... 248/74.3, 58, 73, 49, 74.1, 62, 300
See application file for complete search history.

(56) References Cited

U.S. PATENT DOCUMENTS

| | | | | |
|---|---|---|---|---|
| 3,087,700 A * | 4/1963 | Carpenter et al. | ........... | 248/74.3 |
| 3,143,325 A * | 8/1964 | Carpenter et al. | ........... | 248/68.1 |
| 3,966,154 A * | 6/1976 | Perrault et al. | ........... | 248/62 |
| 4,524,937 A * | 6/1985 | Zizan | ........... | 248/74.3 |
| 5,752,682 A | 5/1998 | Anderson | | |
| 6,231,014 B1 | 5/2001 | Daoud et al. | | |
| 2013/0037661 A1* | 2/2013 | Grubbs | ........... | 248/62 |

FOREIGN PATENT DOCUMENTS

JP   2012055073 A   3/2012

* cited by examiner

*Primary Examiner* — Amy J Sterling
(74) *Attorney, Agent, or Firm* — Miller, Matthias & Hull

(57) ABSTRACT

An apparatus for guiding a cable is provided. The apparatus includes a first plate, a second plate, and a tie. The first plate includes an opening. The second plate angularly extends from the first plate. The second plate includes a cut-out portion configured to allow passage of a tie associated with the cable. The tab extends into the cut-out portion and includes a first member and a second member. The first member is configured to allow wrapping of the tie while the second member is configured to lock a position of the tie.

13 Claims, 7 Drawing Sheets

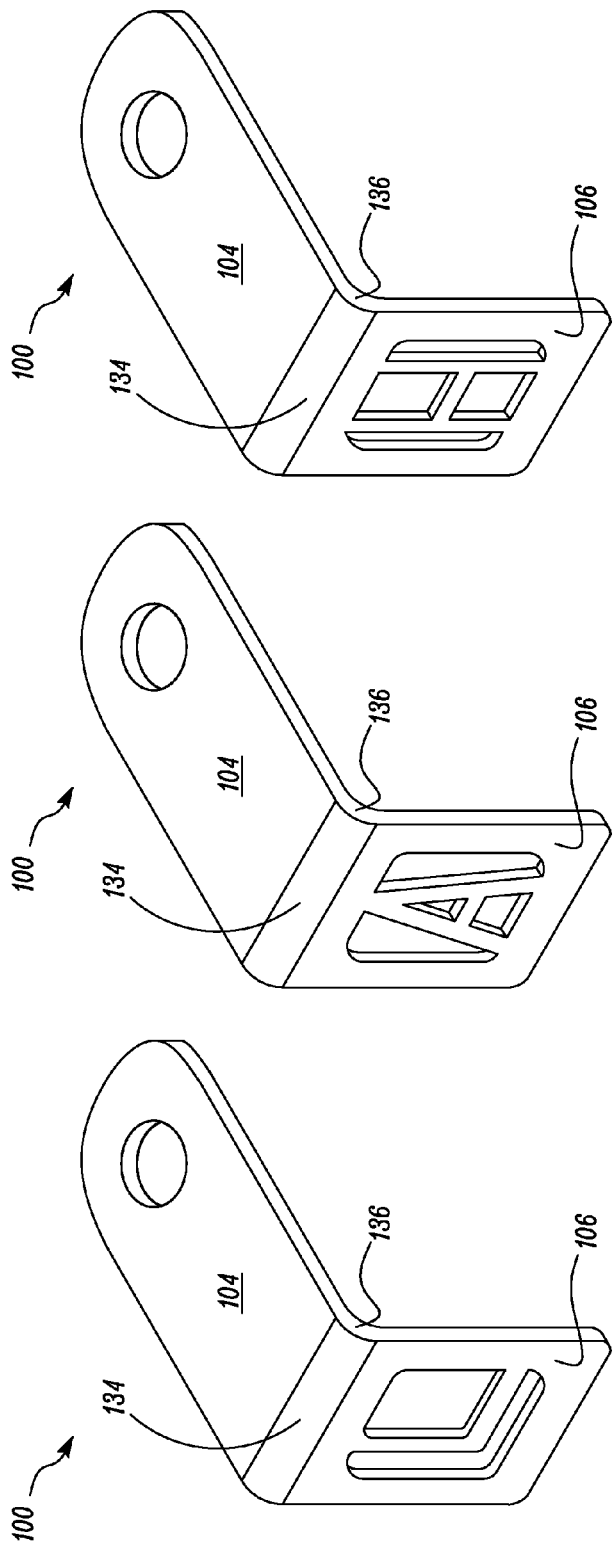

APPARATUS FOR GUIDING CABLE

TECHNICAL FIELD

The present disclosure relates to an apparatus for guiding a cable, and more particularly to an apparatus for guiding a cable around an edge formed by two adjacent sides of a support body.

BACKGROUND

U.S. Pat. No. 4,524,937 relates to a conduit support including a longitudinally extending channel-shaped member having a pair of spaced apart side walls. A rigid buckle-like member is positioned within the conduit support. The rigid member includes a body portion having a plurality of fingers forming a first slot and a second slot extending through the body portion and spaced from one another. Each slot includes an open end portion and a closed end portion, thereby forming parallel, spaced apart arms connected by a bridge section. A flexible locking strip or cable tie of a preselected length extends upwardly through one of the slots across one of the arms and through the other slot and into surrounding relation with a cable. The free ends of the band are locked together to secure the cable to the structural support.

Typically, cables used in machines may need to be bent and routed into various locations. However, conventional cabling systems may merely support a portion of these cables thus offering limited possibilities in bending and guiding/routing the cables around edges. Further, these cabling systems may include buckles and harnesses that may expose sharp edges to the cables. These sharp edges may abut the cable and abrade an insulation of the cable. Over a period of time, the cables may subsequently loose insulation and/or snap based on the abrasion experienced at the sharp edges.

SUMMARY

In one aspect, the present disclosure provides an apparatus for guiding a cable. The apparatus includes a first plate, a second plate, and a tie. The first plate includes an opening. The second plate angularly extends from the first plate. The second plate includes a cut-out portion configured to allow passage of a tie associated with the cable. The tab extends into the cut-out portion and includes a first member and a second member. The first member is configured to allow wrapping of the tie while the second member is configured to lock a position of the tie.

In another aspect, the present disclosure provides an apparatus for guiding a cable. The apparatus includes a first plate, a second plate, and a tab. The first plate includes an opening. The second plate angularly extends from the first plate. The second plate includes a cut-out portion configured to allow passage of a tie associated with the cable. The tab extends longitudinally from an end of the second plate and includes a first member and a second member. The first member is configured to allow wrapping of the tie while the second member is configured to lock a position of the tie.

In another aspect, the present disclosure provides a method of guiding a cable around an edge formed by two adjacent sides of a support body. The method includes positioning a first plate including an opening along a first side of the support body. The method includes positioning a second plate and a tab along a second side of the support body, the tab including a first member and a second member. The method includes fastening a threaded fastener at the first side of the support body through the opening of the first plate. The method includes positioning the cable adjacent to the second plate. The method includes tying a tie associated with the cable to the first member of the tab. The method includes locking the cable in position by the second member.

Other features and aspects of this disclosure will be apparent from the following description and the accompanying drawings.

BRIEF DESCRIPTION OF THE DRAWINGS

FIGS. 4-6 is a perspective view of a the apparatus in accordance with other embodiments of the present disclosure;

DETAILED DESCRIPTION

Figure 1:
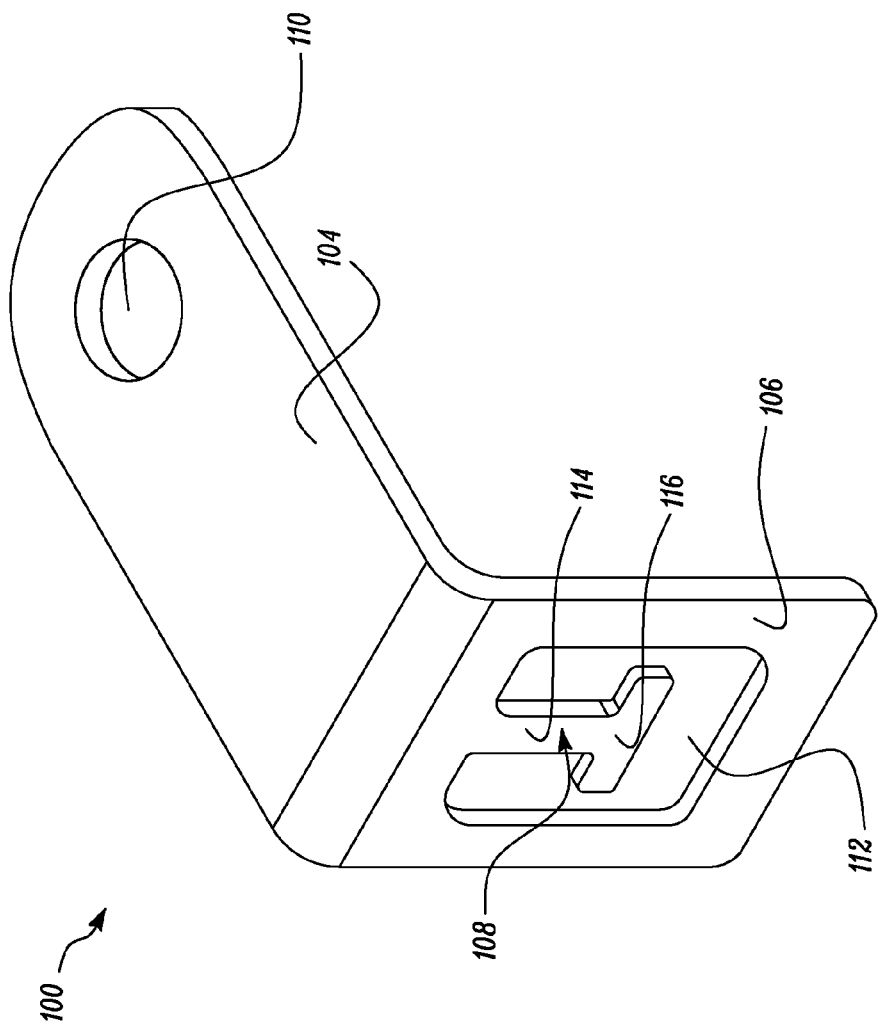
FIG. 1 is a perspective view of an apparatus in accordance with an embodiment of the present disclosure.

The present disclosure relates to an apparatus 100 for guiding a cable 102. FIG. 1 illustrates an apparatus 100 in accordance with an embodiment of the present disclosure. The apparatus 100 includes a first plate 104, a second plate 106, and a tab 108. The first plate 104 includes an opening 110. The second plate 106 angularly extends from the first plate 104. The second plate 106 includes a cut-out portion 112. The tab 108 extends into the cut-out portion 112 and includes a first member 114 and a second member 116.

Figure 2:
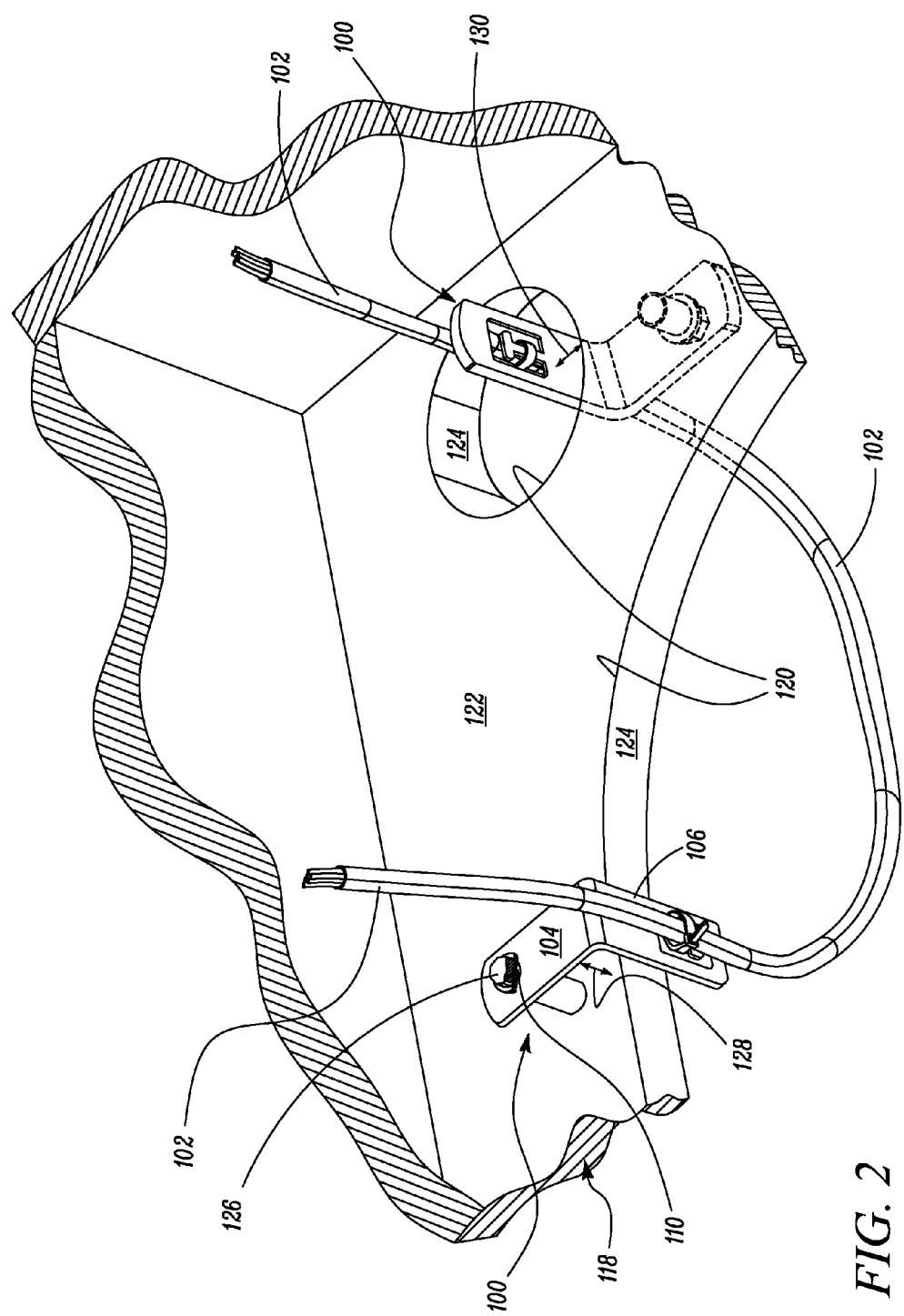
FIG. 2 is a perspective view of a pair of apparatuses fastened to a support body.

FIG. 2 illustrates a pair of apparatuses 100 fastened to a support body 118. In an embodiment as shown in FIG. 2, the apparatus 100 may be configured to guide the cable 102 around an edge 120 formed by two adjacent sides 122, 124 of a support body 118. In this embodiment, the opening 110 on the first plate 104 may be configured to receive a threaded fastener 126 and fasten the apparatus 100 to a first side 122 of the support body 118. In an embodiment, the first plate 104 may be disposed along the first side 122 of the support body 118 while the second plate 106 may be disposed along a second side 124 of the support body 118. In another embodiment as shown in FIG. 2, the first plate 104 may be disposed at an offset 128 from the first side 122 while the second plates 106 may be disposed at an offset 130 from the second side 124 of the support body 118. The offsets 128, 130 from the first side 122 and the second side 124 disclosed in the preceding embodiment may guide the cable 102 substantially away from the edge 120 of the support body 118.

It may be evident from FIG. 2 that a shape of the apparatus 100 may correspond to a contour of the support body 118. However, in various industrial applications, a contour of each support body 118 may vary thus consequently entailing a variation in the shape of the apparatus 100. Therefore, a substantially perpendicular shape of the apparatus 100 shown in FIG. 2 is merely exemplary in nature and hence, non-limiting of this disclosure. A person having ordinary skill in the art may acknowledge that any commonly known shape may be used to form the apparatus 100.

Figure 3:
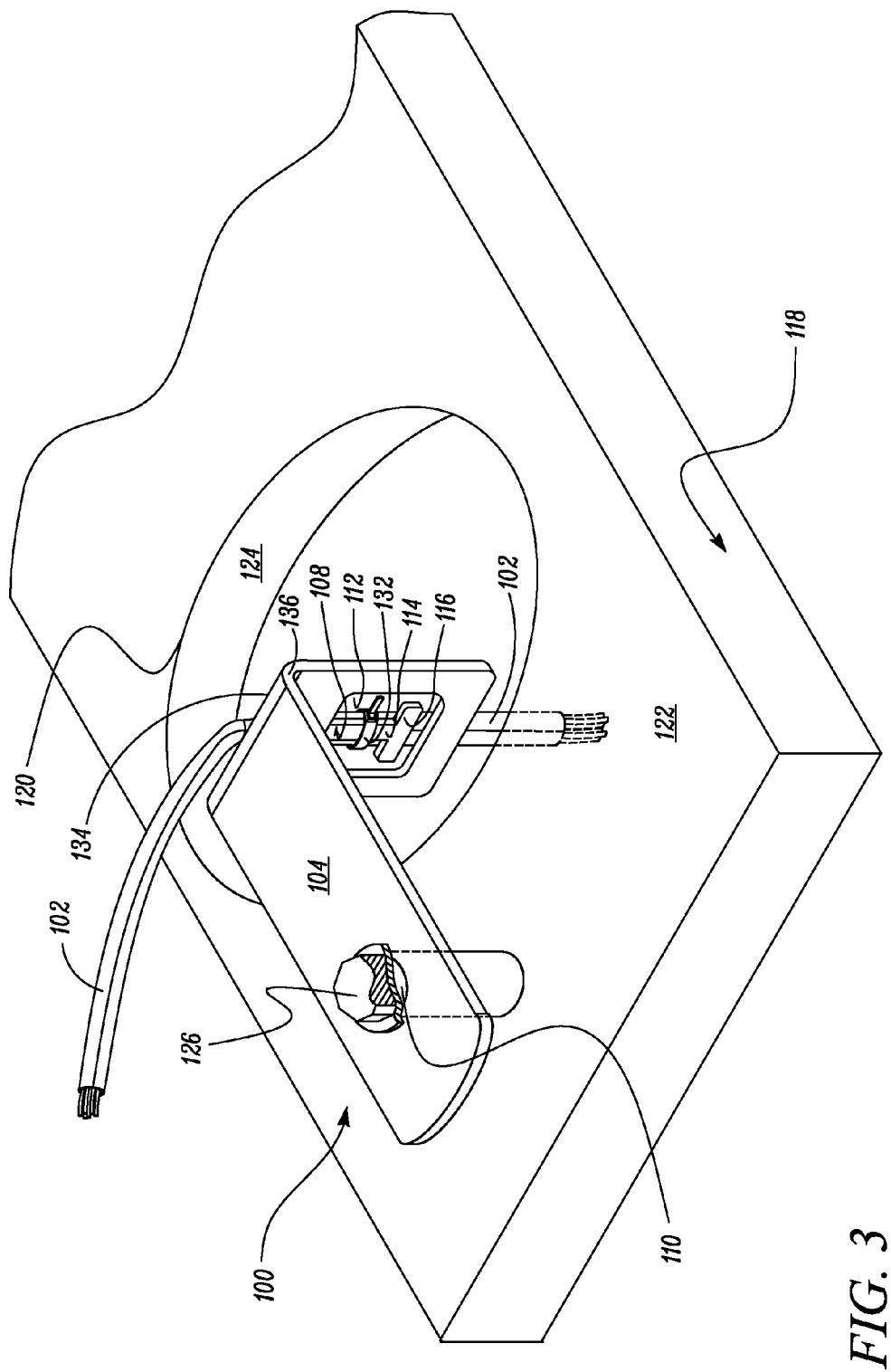
FIG. 3 is a perspective view of the apparatus of FIG. 1.

As shown in FIG. 3, the cut-out portion 112 is configured to allow passage of a tie 132 associated with the cable 102. In an embodiment, a shape of the cut-out portion 112 is substantially polygonal. In an embodiment as shown in FIG. 3, the cut-out portion 112 may be square in shape. In other embodiments, the cut-out portion 112 may be circular or oval in shape.

The first member 114 of the tab 108 is configured to allow wrapping of the tie 132 while the second member 116 of the tab 108 is configured to lock a position of the tie 132. In an embodiment as shown in FIG. 3, the tab 108 may be substantially T-shaped. However, in alternative embodiments shown in FIGS. 4-6, the tab 108 may be L-shaped, A-shaped, or H-shaped. It is to be understood that the shapes of the cut-out portion 112 and the tab 108 disclosed herein are only exemplary and hence, do not limit the scope of this disclosure. Therefore, a person having ordinary skill in the art may acknowledge that other shapes commonly known in the art may be alternatively used to define the cut-out portion 112 and the tab 108 extending therein.

In an embodiment as shown in FIGS. 4-6, a curved edge 134 may be defined at an intersection 136 of the first plate 104 and the second plate 106. In this embodiment, the curved edge 134 may be configured to abut and bend the cable 102. The curved edge 134 disclosed herein may expose a smooth contour that may abut the cable 102. Hence, the cable 102 may be less likely to be abraded by the curved edge 134.

In various embodiments of the present disclosure, the apparatus 100 may be made from plastic, metal, rubber or a combination thereof. A material used in the manufacture of the apparatus 100 may be based on an environment in which the apparatus 100 is intended to be used. Hence, the material of the apparatus 100 may vary depending on the operating conditions associated with the given environment. Therefore, it is to be understood that materials disclosed herein are merely exemplary in nature and other materials commonly known in the art may be used to manufacture the apparatus 100.

Figure 7:
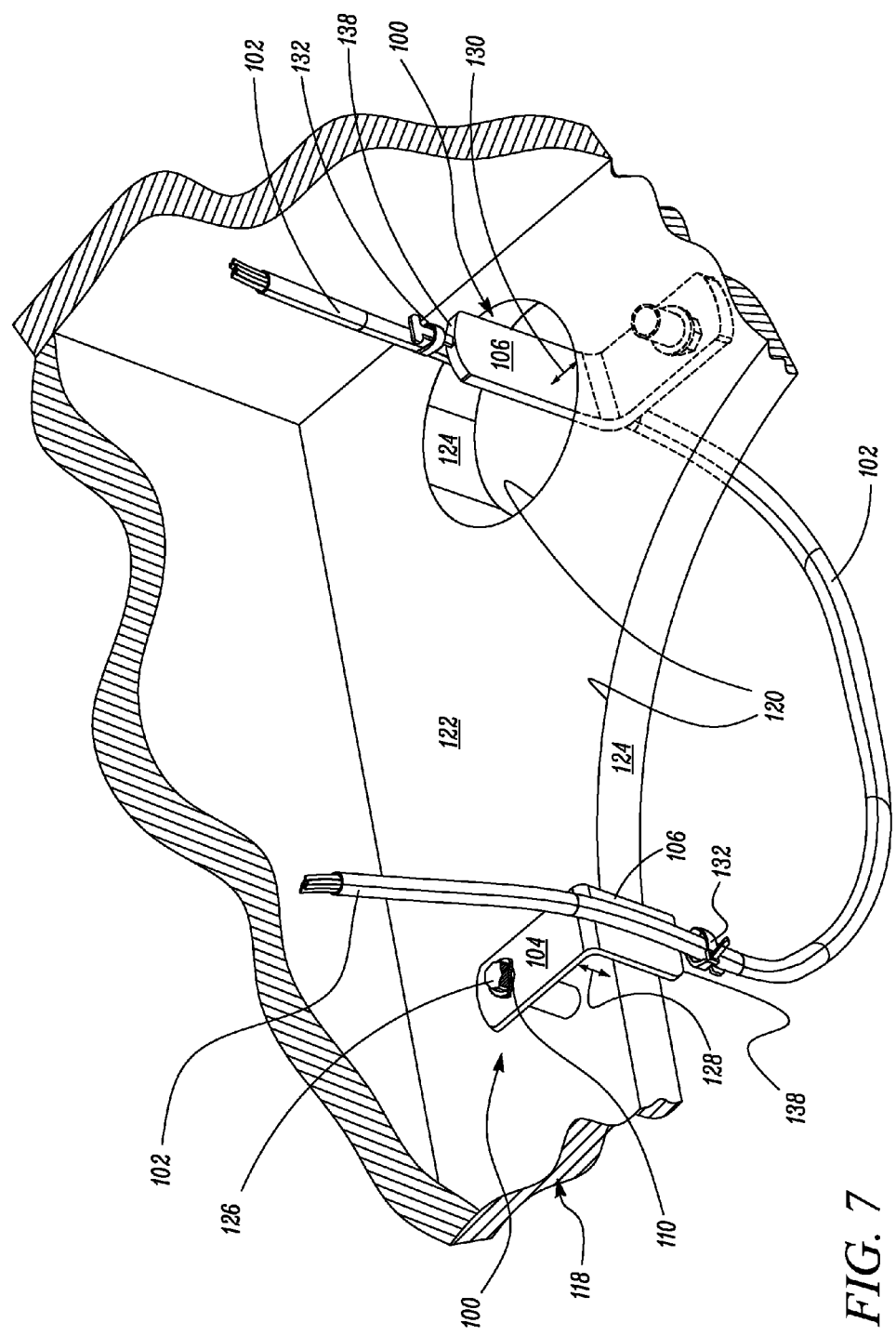
FIG. 7 is a perspective view of a pair of apparatuses in accordance with yet an other embodiment of the present disclosure.
Figure 8:
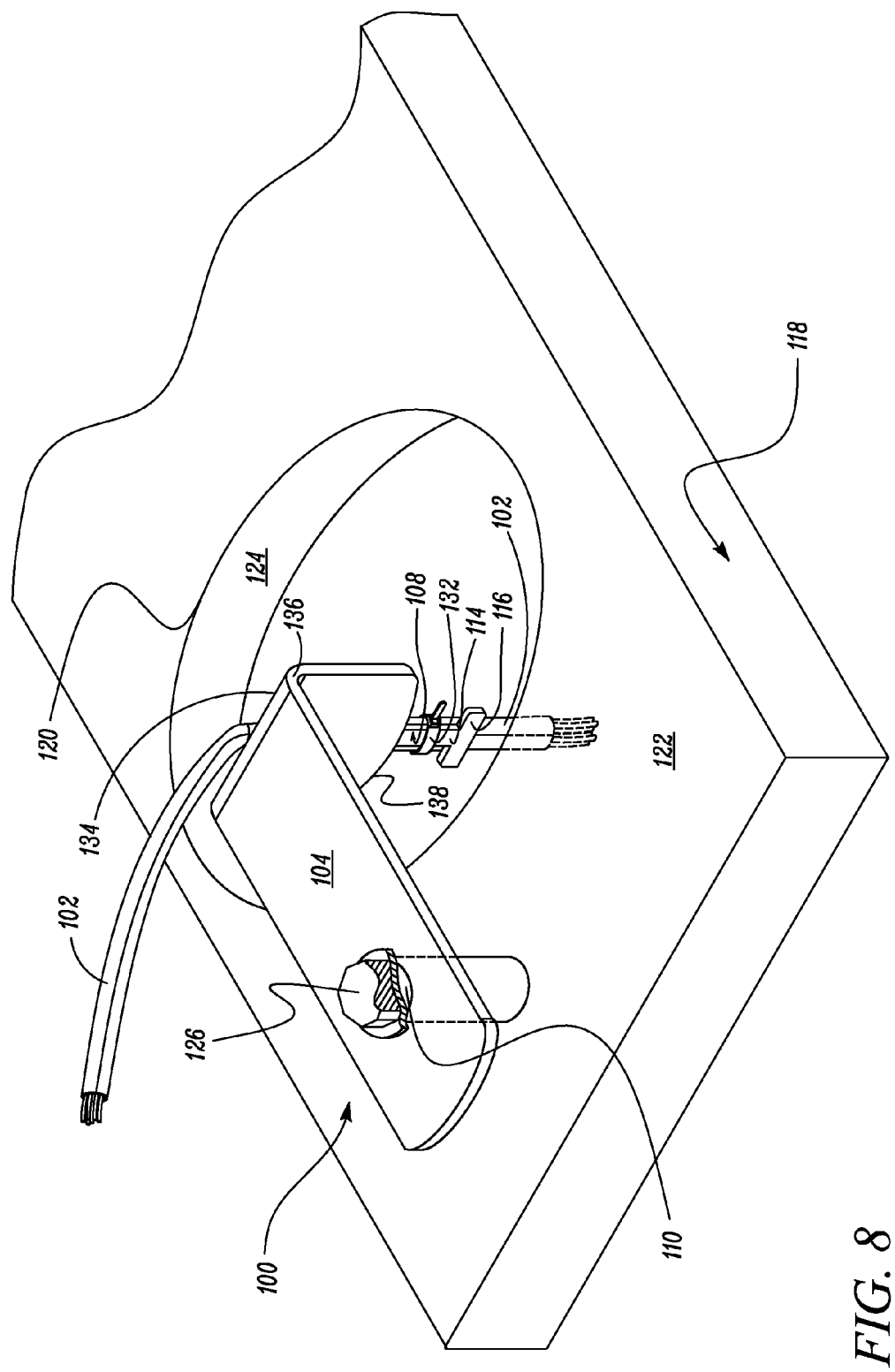
FIG. 8 is a perspective view of the apparatus of FIG. 7.

In an embodiment as shown in FIGS. 7-8, the tab 108 may extend longitudinally from an end 138 of the second plate 106. The tab 108 includes the first member 114 and the second member 116. As disclosed in the preceding embodiments herein, the first member 114 is configured to allow wrapping of the tie 132 associated with the cable 102. The second member 116 is configured to lock a position of the tie 132.

Although it is disclosed herein that the apparatus 100 includes the first plate 104, and the second plate 106 angularly extending from the first plate 104, a person having ordinary skill in the art may acknowledge that any number of adjacently disposed plates may be connected in succession to encounter a support body 118 having one or more adjacent sides 122, 124. Therefore, the apparatus 100 may include any number of plates in it irrespective of the number of adjacent sides on the support body 118. In other words, the apparatus 100 may be formed with more than two plates to guide the cable 102 alongside two or more adjacent sides of the support body 118. Further, one or more plates of the apparatus 100 may include a cut-out portion 112 and a tab 108 extending therein. The tabs 108 disposed within the cut-out portions 112 of successive plates may allow several ties 132 to bind the cable 102 to the apparatus 100 while allowing several bends to the tied cable 102 relative to the support body 118. Therefore, it is to be understood that the first and the second plates 104, 106, disclosed herein are exemplary in nature and hence, do not limit the scope of this disclosure. Any number of plates may be used to form the apparatus 100.

INDUSTRIAL APPLICABILITY

Figure 9:
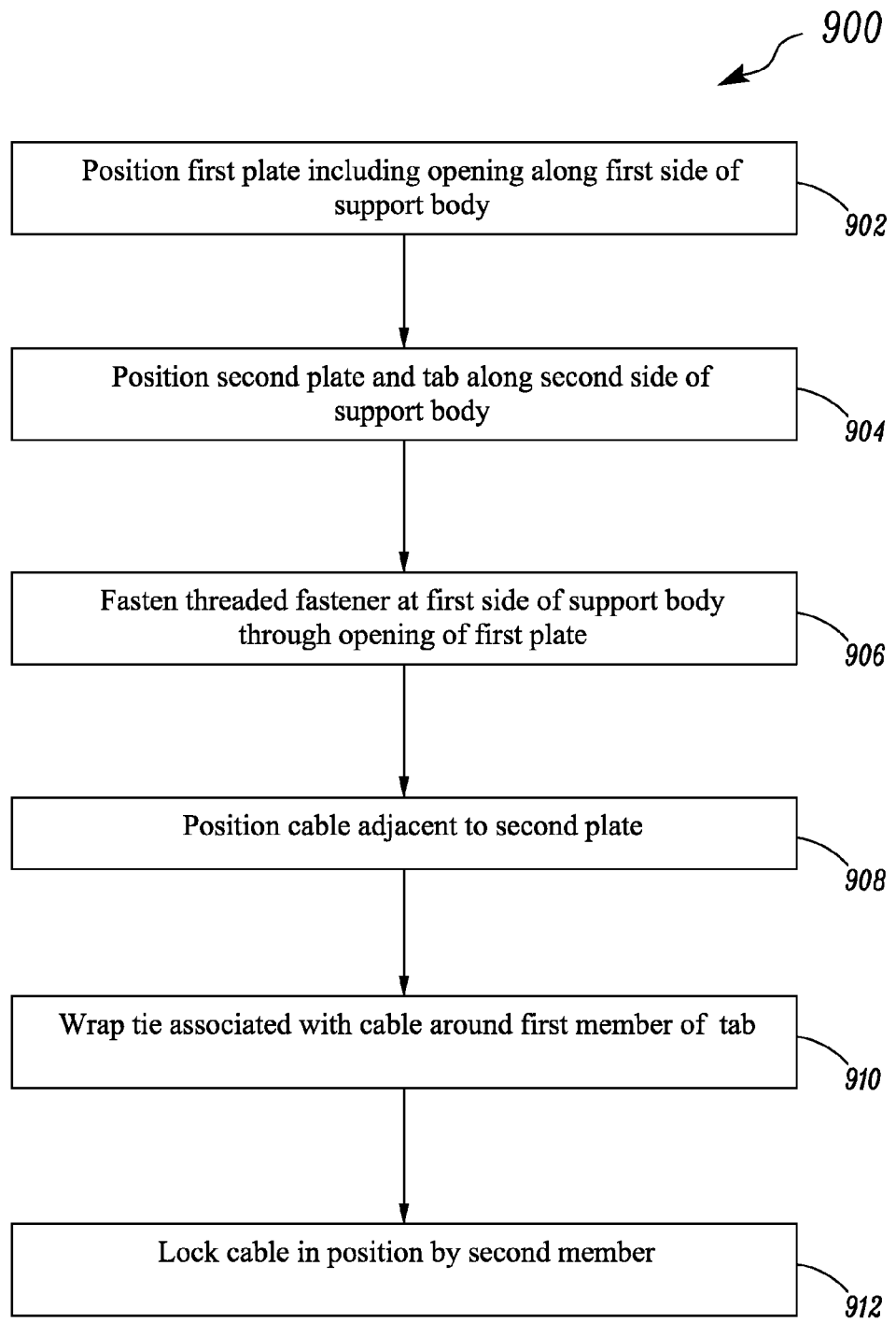
FIG. 9 is a method of guiding a cable around an edge formed by two adjacent sides of a support body.

FIG. 9 illustrates a method 900 of guiding the cable 102 around the edge 120 formed by two adjacent sides 122, 124 of the support body 118. At step 902, the method 900 includes positioning the first plate 104 including the opening 110 along the first side 122 of the support body 118. At step 904, the method 900 includes positioning the second plate 106 and the tab 108 along the second side 124 of the support body 118, the tab 108 including the first member 114 and the second member 116. At step 906, the method 900 includes fastening the threaded fastener 126 at the first side 122 of the support body 118 through the opening 110 of the first plate 104. At step 908, the method 900 includes positioning the cable 102 adjacent to the second plate 106. At step 910, the method 900 includes wrapping the tie 132 associated with the cable 102 around the first member 114 of the tab 108. At step 912, the method 900 includes locking the cable 102 in position by the second member 116. In an embodiment, the method 900 may further include bending the cable 102 at the curved edge 134 defined at the intersection 136 of the first plate 104 and the second plate 106.

Typically, cables 102 used in machines may need to be bent and routed into various locations. Conventional cabling systems may merely support a portion of these cables 102 and thus offer limited possibilities in bending and guiding/routing the cables 102 around edges 120. Further, these cabling systems may include buckles and harnesses that may expose sharp edges to the cables 102. During operation of the machine, a cable 102 may move relative to the cabling system. At this point, the sharp edges of the cabling system may abut and abrade an insulation of the cable 102. Thus, the cable 102 may subsequently loose insulation over a period of time and eventually snap leading to downtimes of the machine. Further, a snapping of one or more cables 102 in the machine may incur additional expenses towards repair or replacement of such cables 102. A person having ordinary skill in the art may acknowledge that repair/replacement of cables 102 may decrease productivity of the machine.

The apparatus 100 disclosed herein may further guide the cable 102 substantially close to a contour of the support body 118. Although it may not be readily apparent to one skilled in the art, in specific embodiments the positioning of the cable 102 substantially close to the support body 118 may concurrently position the cable 102 substantially away from nearby moving components of the machine. Therefore, the cable 102 may be less susceptible to be caught and/or snapped by the nearby moving components. Therefore, implementation of the apparatus 100 in machines may create a void space required for the movement of the moving components. Further, implementation of the apparatus 100 may make overall handling of the machine easier and avoid downtimes incurred in repair/replacement. Therefore, the apparatus 100 may increase productivity associated with the machine.

While aspects of the present disclosure have been particularly shown and described with reference to the embodiments above, it will be understood by those skilled in the art that various additional embodiments may be contemplated by the modification of the disclosed machine, systems and methods without departing from the spirit and scope of what is disclosed. Such embodiments should be understood to fall within the scope of the present disclosure as determined based upon the claims and any equivalents thereof.

We claim:
1. An apparatus for guiding a cable, the apparatus comprising:
    a first plate including an opening;
    a second plate angularly extending from the first plate, the second plate including a cut-out portion configured to allow passage of a tie associated with the cable;

a tab extending into and enclosed by the cut-out portion, the tab including:
- a first member extending from the second plate and configured to allow wrapping of the tie; and
- a second member extending transversely from the first member, the second member having a width larger than the tie and thereby being configured to lock the tie to the tab; and a curved edge defined at an intersection of the first plate and the second plate, the curved edge configured to abut and bend the cable;

wherein the apparatus is configured to guide the cable around an edge formed by two adjacent sides of a support body.

2. The apparatus of claim 1, wherein the opening on the first plate is configured to receive a threaded fastener and fasten the apparatus to a first side of the support body.

3. The apparatus of claim 1, wherein the first and second plates are disposed along a first and second side of the support body.

4. The apparatus of claim 1, wherein the first and second plates are disposed at an offset from a first and second side of the support body.

5. The apparatus of claim 1, wherein a shape of the cut-out portion is one of substantially polygonal, circular, and oval.

6. The apparatus of claim 1, wherein the tab is one of substantially T-shaped, L-shaped, A-shaped, and H-shaped.

7. The apparatus of claim 1, wherein the apparatus is made from one of plastic, metal, rubber, and a combination thereof.

8. An apparatus for guiding a cable, the apparatus comprising:
- a first plate including an opening configured to receive a threaded fastener;
- a second plate angularly extending from the first plate;
- a tab extending longitudinally from an end of the second plate, the tab including:
  - a first member extending from the second plate and configured to allow wrapping of a tie associated with the cable; and
  - a second member extending transversely from the first member, the second member having a width larger than the tie and thereby being configured to lock the tie to the tab; and
- a curved edge defined at an intersection of the first plate and the second plate, the curved edge configured to abut and bend the cable;

wherein the apparatus is configured to guide the cable around an edge formed by two adjacent sides of a support body.

9. The apparatus of claim 8, wherein the opening on the first plate is configured to receive a threaded fastener and fasten the apparatus to a first side of the support body.

10. The apparatus of claim 8, wherein the first and second plates are disposed along a first and second side of the support body.

11. The apparatus of claim 8, wherein the first and second plates are disposed at an offset from a first and second side of the support body.

12. The apparatus of claim 8, wherein the tab is one of substantially T-shaped, L-shaped, A-shaped, and H-shaped.

13. The apparatus of claim 8, wherein the apparatus is made from one of plastic, metal, rubber, and a combination thereof.

* * * * *